US012623348B2

(12) United States Patent
Shu et al.

(10) Patent No.: US 12,623,348 B2
(45) Date of Patent: May 12, 2026

(54) DOUBLE-ROBOTIC-ARM COLLABORATIVE FLEXIBLE ASSEMBLY SYSTEM AND METHOD FOR DISORDERED CIRCUIT BREAKER PARTS

(71) Applicant: Wenzhou University, Wenzhou City (CN)

(72) Inventors: Liang Shu, Wenzhou City (CN); Hao Zhou, Wenzhou City (CN)

(73) Assignee: Wenzhou University, Wenzhou City (CN)

( * ) Notice: Subject to any disclaimer, the term of this patent is extended or adjusted under 35 U.S.C. 154(b) by 162 days.

(21) Appl. No.: 18/766,760

(22) Filed: Jul. 9, 2024

(65) Prior Publication Data

US 2025/0018572 A1      Jan. 16, 2025

(30) Foreign Application Priority Data

Jul. 13, 2023      (CN) .......................... 202310859560.1

(51) Int. Cl.
B25J 9/16                (2006.01)
(52) U.S. Cl.
CPC ............. B25J 9/1666 (2013.01); B25J 9/163 (2013.01); B25J 9/1669 (2013.01); B25J 9/1682 (2013.01); B25J 9/1697 (2013.01)

(58) Field of Classification Search
None
See application file for complete search history.

(56) References Cited

U.S. PATENT DOCUMENTS

| | | | |
|---|---|---|---|
| 2024/0300097 A1* | 9/2024 | Romeres ................ | B25J 9/1661 |
| 2025/0256403 A1* | 8/2025 | Fine ........................ | B25J 9/1692 |
| 2026/0011111 A1* | 1/2026 | Arafa ..................... | G06V 10/26 |

* cited by examiner

*Primary Examiner* — Arslan Azhar
(74) *Attorney, Agent, or Firm* — GRUMBLES LAW PLLC; Brittany Haanan

(57)                ABSTRACT

A double-robotic-arm collaborative flexible assembly system and method for disordered circuit breaker parts is provided. The system includes a target detection positioning module, configured to process an image of various types of circuit breaker parts disorderly placed in a loading tray, and determine spatial pose information and type information of the circuit breaker parts; an intelligent obstacle avoidance grabbing module, configured to determine an optimal obstacle avoidance path, clamping jaw types, and a moving instruction; and a double-robotic-arm flexible collaborative module, configured to determine an optimal double-robotic-arm collaborative technology by using a trained double-robotic-arm collaborative technology decision-making model according to the type information of the target circuit breaker part, and then place the target circuit breaker part into a loading mold.

8 Claims, 14 Drawing Sheets

Obstacle a $L_i$

Connecting rod i $r$

Obstacle b

Connecting rod i-1

$L_{i-1}$

P

Arc extinguishing chamber

Magnetic core

Loading tray

Magnet yoke

Magnetic assembly

Handle

Large U-shaped magnet

Connecting mechanism

Clampin jaw 1
11~17mm

Clamping jaw 2 clamping distance
16~22mm

Clamping jaw 3 clamping distance
0~6mm

Clamping jaw 4 clamping distance
3~9mm

Master robotic arm clamping jaw    Master robotic arm clamping jaw    Slave robotic arm clamping jaw Slave robotic arm clamping jaw Grabbing                Collaborative adjustment                Assembly Magnetic assembly Magnetic core Magnet yoke Large U-shaped magnet Handle Arc extinguishing
chamber （a）Standard RRT (b) Improved RRT Collaboration Obstacle avoidance Assembly

DOUBLE-ROBOTIC-ARM COLLABORATIVE FLEXIBLE ASSEMBLY SYSTEM AND METHOD FOR DISORDERED CIRCUIT BREAKER PARTS

CROSS-REFERENCE TO RELATED APPLICATION

This patent application claims the benefit and priority of Chinese Patent Application No. 202310859560.1 filed with the China National Intellectual Property Administration on Jul. 13, 2023, the disclosure of which is incorporated by reference herein in its entirety as part of the present application.

TECHNICAL FIELD

The present disclosure relates to the technical field of circuit breaker assembly and manufacturing, and in particular, to a double-robotic-arm collaborative flexible assembly system and method for disordered circuit breaker parts.

BACKGROUND

A circuit breaker is an important electric equipment in a distribution network, which is widely applied in fields of industry, civilian use, and the like. The circuit breaker has the characteristics of many parts, complex composition structure, inconsistent size specifications, and the like. Current circuit breakers are mainly manufactured manually. A conventional automatic assembly unit has a great rigid constraint, and can only complete production and assembly of a circuit breaker part in a single specification, which leads to too high equipment investment cost for a manufacturing enterprise with a large number of types of circuit breaker products and high yield. Due to the lack of a flexible assembly technology, an assembly flow is cumbersome and complex, and a traditional automatic assembly production line cannot flexibly adapt to updates and iterations of products, and constrains the efficiency of production assembly and the reliability of the products.

An industrial robot has the advantages of high work efficiency, stability, reliability, and the like, and is more and more applied in manufacturing industry. A novel circuit breaker assembly system and method which take flexibility as a main feature are researched by combining the industrial robot and automatic manufacturing of the circuit breaker, which can adapt to different product assembly technologies, greatly reduce cost and shorten time, and are of great significance for improving product performance and production efficiency. For example, a conventional art provides a flexible automatic assembly manufacturing technology and a supporting production line for a circuit breaker. A robotic arm is introduced to match a mechanical auxiliary mechanism to achieve flexible assembly of complex circuit breaker parts of the circuit breaker. However, during a process of adjusting a pose of a workpiece by matching the robotic arm and the mechanical auxiliary mechanism, this solution has the problems of machining action redundancy, over-large joint angles in movement of the robotic arm, and long assembly time.

SUMMARY

An objective of the present disclosure is to provide a double-robotic-arm collaborative flexible assembly system and method for disordered circuit breaker parts, which can perceive a dynamic assembly environment in a workshop, achieve recognition, positioning, and grabbing of various types of disordered complex circuit breaker parts, can adapt to flexible assembly of circuit breaker parts in different specifications at any pose, and solves the problem about rigid constraint in an assembly manufacturing process of an existing circuit breaker.

To achieve the above objective, the present disclosure provides the following solutions:

The present disclosure provides a double-robotic-arm collaborative flexible assembly system for disordered circuit breaker parts. The double robotic arms include a master robotic arm and a slave robotic arm. The master robotic arm is mounted at a side close to a loading tray. The slave robotic arm is mounted at a side close to an assembly carrier. Each of the master robotic arm and the slave robotic arm is provided with an end effector. Movement processes of the double robotic arms are performed in three working spaces, comprising a grabbing space, a collaborative space, and an assembly spacey. The double-robotic-arm collaborative flexible assembly system includes:

a target detection positioning module, configured to obtain and process an image of various types of circuit breaker parts disorderly placed in a loading tray, and determine spatial pose information and type information of each circuit breaker part;

an intelligent obstacle avoidance grabbing module, configured to determine an optimal obstacle avoidance path and clamping jaw types by using an improved Rapidly-Exploring Random Trees (RRT) algorithm according to the spatial pose information and the type information of a target circuit breaker part, and determine a moving instruction according to the optimal obstacle avoidance path, where the improved RRT algorithm is an algorithm that introduces an artificial potential field on a basis of an RRT algorithm to jointly determine a node growth increment by a fixed step and a potential field component; the moving instruction is configured to control the master robotic arm to move from a corresponding end effector space position to a target circuit breaker part grabbing space position, control the master robotic arm to grab the target circuit breaker part to move from the target circuit breaker part grabbing space position to a collaborative space position, control the slave robotic arm to move from a corresponding end effector space position to the collaborative space position, and control the slave robotic arm to grab the target circuit breaker part with a standard assembly pose to move from the collaborative space position to the assembly space; and the target circuit breaker part is a circuit breaker part to be grabbed;

an double-robotic-arm flexible collaborative module, configured to determine an optimal double-robotic-arm collaborative technology by using a trained double-robotic-arm collaborative technology decision-making model according to the type information of the target circuit breaker part, and determine a circuit breaker part pose adjustment assembly instruction according to the optimal double-robotic-arm collaborative technology, where the circuit breaker part pose adjustment assembly instruction is configured to control the slave robotic arm to adjust the target circuit breaker part that is grabbed by the master robotic arm and does not conform to an assembly pose to the target circuit breaker part with the standard assembly pose, and control the slave robotic arm to place the target circuit breaker part with the standard assembly pose into a loading mold.

The present disclosure further provides a double-robotic-arm collaborative flexible assembly method for disordered circuit breaker parts. The double robotic arms include a master robotic arm and a slave robotic arm. The master robotic arm is mounted at a side close to a loading tray. The slave robotic arm is mounted at a side close to an assembly carrier. Each of the master robotic arm and the slave robotic arm is provided with an end effector. Movement processes of the double robotic arms are performed in three working spaces, comprising a grabbing space, a collaborative space, and an assembly space. The double-robotic-arm collaborative flexible assembly method includes:

obtaining and processing an image of various types of circuit breaker parts disorderly placed in the loading tray, and determining spatial pose information and type information of each circuit breaker part;

determining an optimal obstacle avoidance path and clamping jaw types by using an improved RRT algorithm according to the spatial pose information and the type information of a target circuit breaker part, and determining a moving instruction according to the optimal obstacle avoidance path, where the improved RRT algorithm is an algorithm that introduces an artificial potential field on a basis of an RRT algorithm to jointly determine a node growth increment by a fixed step and a potential field component, the moving instruction is configured to control the master robotic arm to move from a corresponding end effector space position to a target circuit breaker part grabbing space position, control the master robotic arm to grab the target circuit breaker part to move from the target circuit breaker part grabbing space position to a collaborative space position, control the slave robotic arm to move from a corresponding end effector space position to the collaborative space position, and control the slave robotic arm to grab the target circuit breaker part with a standard assembly pose to move from the collaborative space position to the assembly space, and the target circuit breaker part is a circuit breaker part to be grabbed; and determining an optimal double-robotic-arm collaborative technology by using a trained double-robotic-arm collaborative technology decision-making model according to the type information of the target circuit breaker part, and determining a circuit breaker part pose adjustment assembly instruction according to the optimal double-robotic-arm collaborative technology, where the circuit breaker part pose adjustment assembly instruction is configured to control the slave robotic arm to adjust the target circuit breaker part that is grabbed by the master robotic arm and does not conform to an assembly pose to the target circuit breaker part with the standard assembly pose, and control the slave robotic arm to place the target circuit breaker part with the standard assembly pose into a loading mold.

According to specific embodiments provided in the present disclosure, the present disclosure discloses the following technical effects:

In a circuit breaker part flexible assembly task, an image of circuit breaker parts disorderly placed in a loading tray is collected, the image is processed, spatial pose information of the circuit breaker parts is calculated, and accurate grabbing is achieved, interference of a dynamic environment of a workshop is adapted, there is no limitation of types of the circuit breaker parts, and the adaptivity of a production line is improved. An optimal obstacle avoidance path is planned by using an improved RRT algorithm, and redundant path and equipment energy consumption are reduced. The double-robotic-arm collaborative technology decision-making model is trained by using a Deep Deterministic Policy Gradient (DDPG) algorithm, which shortens debugging time of artificial teaching demonstration, accelerates debugging progress of the production line, replaces a traditional solution of adjusting a pose by means of a vibration disc, reduces a number of pieces of equipment mounted, and reduces enterprise cost. A robotic arm modular solution can better adapt to adjustment of post-production of the production line, improve reuse rate of equipment, and reduce personnel cost for equipment operation and maintenance.

BRIEF DESCRIPTION OF THE DRAWINGS

To describe technical solutions in embodiments of the present disclosure or in the related art more clearly, the following briefly describes the drawings required for describing the embodiments. Apparently, the drawings in the following description are merely some embodiments of the present disclosure, and those of ordinary skill in the art may still obtain other drawings from these drawings without creative efforts.

DETAILED DESCRIPTION OF THE EMBODIMENTS

Technical solutions in embodiments of the present disclosure will be clearly and completely described below with reference to the drawings in the embodiments of the present disclosure. Apparently, the described embodiments are merely part rather than all of the embodiments of the present disclosure. On the basis of the embodiments in the present disclosure, all other embodiments obtained by those of ordinary skill in the art without creative work fall within the scope of protection of the present disclosure.

To make the above objective, features, and advantages of the present disclosure more apparent and more comprehensible, the present disclosure is further described in detail below with reference to accompanying drawings and specific implementations.

Embodiment 1

A technical problem to be solved in the embodiments of the present disclosure is to provide a double-robotic-arm collaborative flexible assembly system for disordered circuit breaker parts. The system can perceive a dynamic environment in an assembly workshop, and recognize and position disordered complex circuit breaker parts by means of an industrial camera without adjusting into a single standard pose by a vibration disc, which improves generalization capability and adaptability of the system. Robotic arms are guided to avoid obstacles and grab circuit breaker parts according to recognized and positioned position and spatial angle information of the circuit breaker parts, and then a task type of a workpiece is recognized to determine a double-robotic-arm collaborative technology, so that a set of equipment adapts to flexible assembly of the circuit breaker parts in different types and different specifications and sizes, and the flexible production performance of an overall assembly production line and the efficiency of assembly production are improved.

In a circuit breaker part flexible assembly process, priority of two robotic arms is set according to a control policy of the double robotic arms, and a master robotic arm and a slave robotic arm are respectively arranged. Movement processes of the double robotic arms include four stages of accurate grabbing, obstacle avoidance planning, collaborative adjustment, and flexible assembly. These four stages are performed in three working spaces. An end effector of a robotic arm starts to perform corresponding actions when entering corresponding working spaces, which are respectively a grabbing space when the master robotic arm grabs six types of circuit breaker parts in different poses in the loading tray, a collaborative space when the master robotic arm and the slave robotic arm collaborate and match to adjust a pose of the circuit breaker part, and an assembly space when the slave robotic arm clamps and assembles a circuit breaker part in a standard pose.

Figure 1:
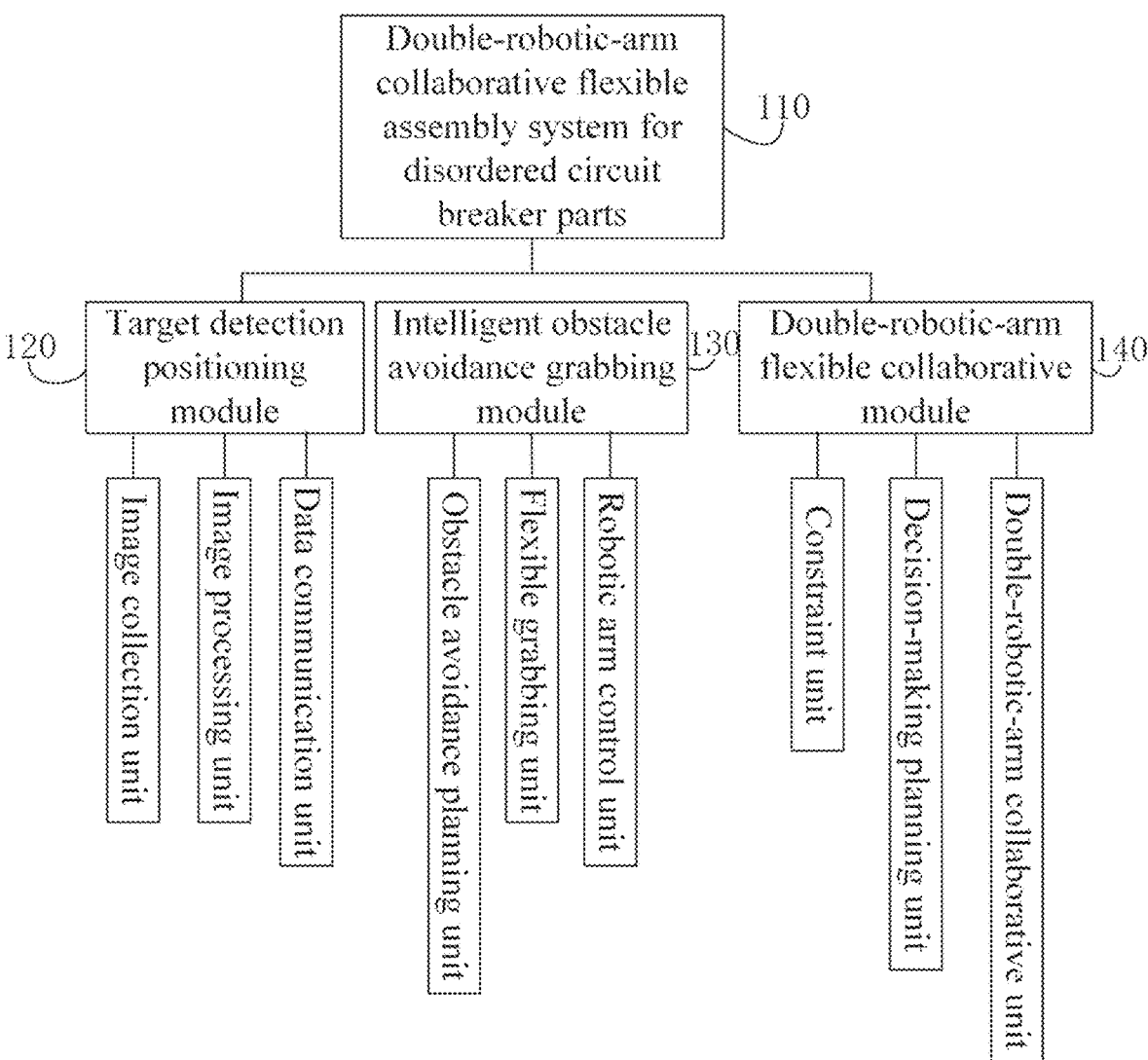
FIG. 1 is a structural block diagram of a double-robotic-arm collaborative flexible assembly method for disordered circuit breaker parts according to an embodiment of the present disclosure.

As shown in FIG. 1, the embodiments of the present disclosure provide a double-robotic-arm collaborative flexible assembly system for disordered circuit breaker parts. Double robotic arms include a master robotic arm and a slave robotic arm. The master robotic arm is mounted at a side close to the loading tray. The slave robotic arm is mounted at a side close to an assembly carrier. Both the master robotic arm and the slave robotic arm are provided with end effectors. Movement processes of the double robotic arms are performed in three working spaces, namely, the grabbing space, the collaborative space, and the assembly space respectively.

The double-robotic-arm collaborative flexible assembly system 110 for disordered circuit breaker parts includes three parts, namely, a target detection positioning module 120, an intelligent obstacle avoidance grabbing module 130, and a double-robotic-arm flexible collaborative module 140.

Figure 2:
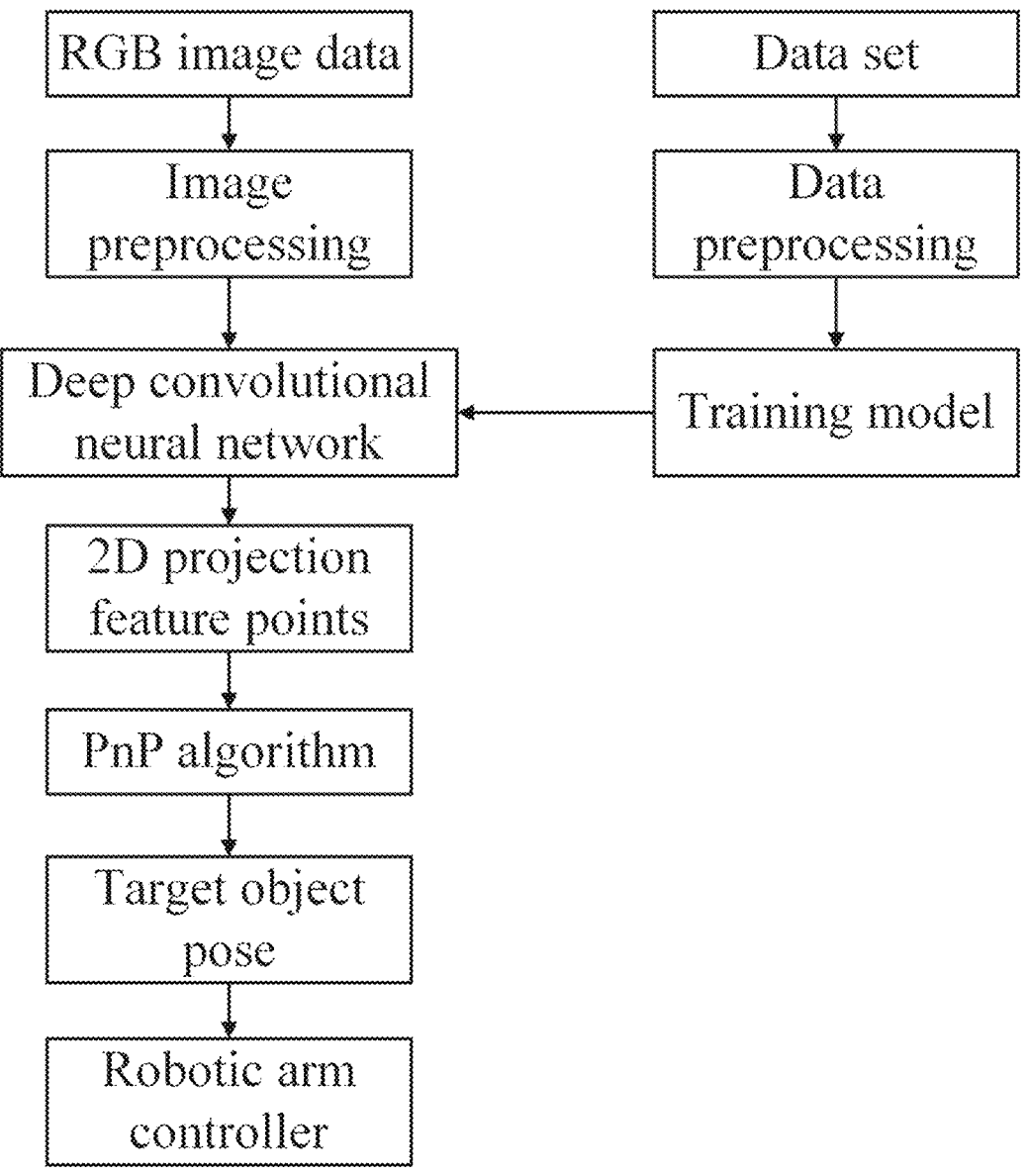
FIG. 2 is a flowchart of a target pose estimation algorithm according to an embodiment of the present disclosure.

The target detection positioning module 120 is configured to obtain and process an image of various types of circuit breaker parts disorderly placed in the loading tray, and determine spatial pose information and type information of each circuit breaker part. A flow of a target pose estimation algorithm is shown in FIG. 2.

The intelligent obstacle avoidance grabbing module 130 is configured to determine an optimal obstacle avoidance path and clamping jaw types by using an improved RRT algorithm according to the spatial pose information and the type information of a target circuit breaker part, and determine a moving instruction according to the optimal obstacle avoidance path. The improved RRT algorithm is an algorithm that introduces an artificial potential field on the basis of an RRT algorithm to jointly determine a node growth increment by a fixed step and a potential field component. The moving instruction is configured to control the master robotic arm to move from a corresponding end effector space position to a target circuit breaker part grabbing space position, control the master robotic arm to grab the target circuit breaker part to move from the target circuit breaker part grabbing space position to a collaborative space position, control the slave robotic arm to move from the corresponding end effector space position to the collaborative space position, and control the slave robotic arm to grab the target circuit breaker part with a standard assembly pose to move from the collaborative space position to the assembly space. The target circuit breaker part is a circuit breaker part to be grabbed.

The double-robotic-arm flexible collaborative module 140 is configured to determine an optimal double-robotic-arm collaborative technology by using a trained double-robotic-arm collaborative technology decision-making model according to the type information of the target circuit breaker part, and determine a circuit breaker part pose adjustment assembly instruction according to the optimal double-robotic-arm collaborative technology. The circuit breaker part pose adjustment assembly instruction is configured to control the slave robotic arm to adjust the target circuit breaker part that is grabbed by the master robotic arm and does not conform to an assembly pose to the target circuit breaker part with the standard assembly pose, and control the slave robotic arm to place the target circuit breaker part with the standard assembly pose into a loading mold.

In the embodiments of the present disclosure, the target detection positioning module 120 includes an image collection unit, an image processing unit, and a data communication unit.

To accurately grab circuit breaker parts in different types and different poses in the loading tray after the master robotic arm enters the grabbing space. A Red-Green-Blue (RGB) image of the circuit breaker parts to be grabbed is shot by using an industrial camera, and bounding boxes with simple geometric structures are used to replace complex 3D object models, so as to simplify a spatial pose information calculation process and improve spatial pose information calculation efficiency.

The image collection unit is configured to obtain an RGB image of various types of circuit breaker parts disorderly placed in the loading tray shot by the industrial camera.

The image processing unit is configured to:

process the RGB image, and determine the type information of each circuit breaker part;

extract 2-Dimensional (2D) projection feature points of each circuit breaker part on the RGB image by using a deep convolutional neural network;

calculate a spatial position and a rotation angle of each circuit breaker part in a camera coordinate system according to the 2D projection feature points and a Perspective-n-Point (PnP) algorithm; and determine a spatial position and a rotation angle of each circuit breaker part in a robotic arm coordinate system according to the spatial position and the rotation angle of each circuit breaker part in the camera coordinate system, where the spatial pose information includes the spatial position and the rotation angle in the robotic arm coordinate system.

The PnP algorithm includes two types of $3 \leq n \leq 5$ and $n \geq 6$ according to different numbers of selected feature reference points. The first type has low accuracy and low robustness and is easily affected by noise interference due to few feature reference points. For the second type, there are relatively more feature reference points available for pose calculation, the accuracy, the noise resistance, and the robustness of the algorithm are superior to those of the first type, so in the embodiments of the present disclosure, the spatial pose information is calculated by taking eight vertexes of the bounding box and a centroid of the target circuit breaker part as feature reference points. Assuming that coordinates of a spatial point is $P_i=[X_i\ Y_i\ Z_i]^T$ and projection coordinates of the spatial point on the RGB image is $P_i=[u_i\ v_i]^T$, a relationship between a pixel point position and a spatial coordinate point position is shown in Formula (1):

$$z_i \begin{bmatrix} u_i \\ v_i \\ 1 \end{bmatrix} = \begin{bmatrix} f_x & 0 & u_0 \\ 0 & f_y & v_0 \\ 0 & 0 & 1 \end{bmatrix} [R_{3\times3}\ \ T_{3\times1}] \begin{bmatrix} X_i \\ Y_i \\ Z_i \\ 1 \end{bmatrix}. \tag{1}$$

A rotation matrix in the above formula is represented by using a quaternion. Assuming the quaternion $q=q_0\pm q_1 i+q_2 j+ q_3 k$, and a relationship among $q_0$, $q_1$, $q_2$, and $q_3$ is as follows:

$$q_0^2 + q_1^2 + q_2^2 + q_3^2 = 1,$$

for Formula (1):

$$\begin{bmatrix} u_i \\ v_i \\ 1 \end{bmatrix} = \frac{1}{z_i} K \begin{bmatrix} 1-2q_2^2-2q_3^2 & 2q_1q_2+2q_0q_3 & 2q_1q_3-2q_0q_2 & t_1 \\ 2q_1q_2-2q_0q_3 & 1-2q_1^2-2q_3^2 & 2q_2q_3+2q_0q_1 & t_2 \\ 2q_1q_3+2q_0q_2 & 2q_2q_3-2q_0q_1 & 1-2q_1^2-2q_2^2 & t_3 \end{bmatrix} \tag{2}$$

-continued $$\begin{bmatrix} X_i \\ Y_i \\ Z_i \\ 1 \end{bmatrix} = KT \begin{bmatrix} X_i \\ Y_i \\ Z_i \\ 1 \end{bmatrix}.$$

Where, K is an intrinsic parameter of a camera, T is an extrinsic parameter of the camera, setting $u_i=[u_i\ v_i\ 1]^T$ and $P_i=[X_i\ Y_i\ Z_i\ 1]^T$, for above Formula (2), there is:

$$u_i = \frac{1}{z_i} KTP_i. \tag{3}$$

Pixel point coordinates $u_i$ are calculated through a 2D projection feature point extracted from the RGB image, and spatial position data of the target circuit breaker part corresponding to an actual robotic arm coordinate system is calculated by using Formula (3).

The data communication unit is configured to, by using a Transmission Control Protocol (TCP), transmit the spatial pose information and the type information of each circuit breaker part to the intelligent obstacle avoidance grabbing module 130 to guide the master and slave robotic arms to grab the circuit breaker part, and transmit the type information of each circuit breaker part to the double-robotic-arm flexible collaborative module 140 to determine the optimal double-robotic-arm collaborative technology to complete a collaborative assembly action.

In the embodiments of the present disclosure, the intelligent obstacle avoidance grabbing module 130 includes an obstacle avoidance planning unit, a flexible grabbing unit, and a robotic arm control unit.

The obstacle avoidance planning unit is configured to determine a grabbing space position point according to the received spatial pose information of the target circuit breaker part, and plan an optimal obstacle avoidance path by taking the grabbing space position point as a target point of the optimal obstacle avoidance path and combining the improved RRT algorithm.

The flexible grabbing unit is configured to determine clamping jaw types of the master robotic arm and the slave robotic arm according to the received type information of the target circuit breaker part.

The robotic arm control unit is configured to determine the moving instruction according to the optimal obstacle avoidance path.

Further, the obstacle avoidance planning unit is specifically configured to:

replace joint models of the double robotic arms and environmental obstacles by using bounding boxes to obtain a simplified double-robotic-arm working model; and in the simplified double-robotic-arm working model, determine the grabbing space position point according to the received spatial pose information of the target circuit breaker part, and plan the optimal obstacle avoidance path including the master robotic arm moving from the corresponding end effector space position to the target circuit breaker part grabbing space position, the master robotic arm grabbing the target circuit breaker part to move from the target circuit breaker part grabbing space position to the collaborative space position, the slave robotic arm moving from the corresponding end effector space position to the collaborative space position, and the slave robotic arm grabbing the target circuit breaker part with the standard assembly pose to move from the collaborative space position to the assembly space by taking the grabbing space position point as the target point of the optimal obstacle avoidance path and combining the improved RRT algorithm.

Figure 3:
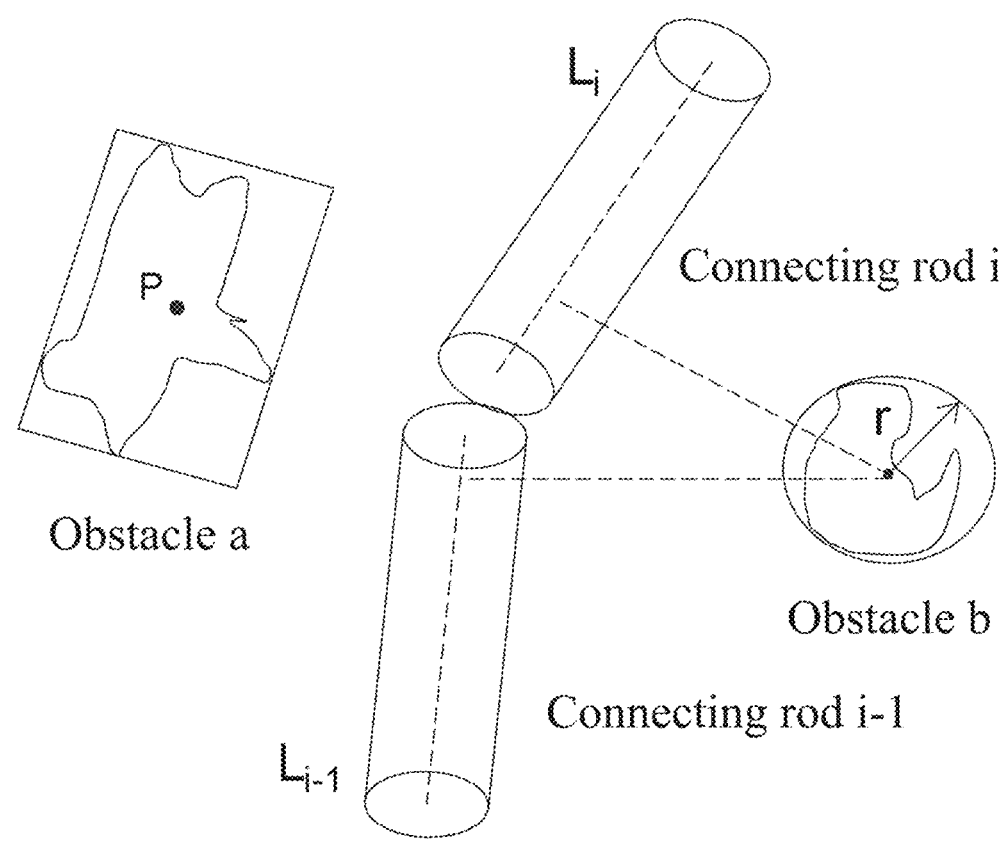
FIG. 3 is a schematic diagram of a simplified model of an actual environment in a workshop according to an embodiment of the present disclosure.

To improve the flexibility and the adaptivity of the assembly system, a double-robotic arm collaboration solution is used. To simplify a complex model of double robotic arms and environmental obstacles, the bounding boxes such as cylinders and spheres are used to replace joint models of double robotic arms and the environmental obstacles. An idea of the method is to use regular geometries to replace irregular objects in an actual environment, so that collision detection among various objects is converted into an interference problem among a series of geometries, and a simplified model is shown in FIG. 3. Movement paths of the double robotic arms are planned in a high-dimensional space, so an RRT algorithm is selected in the embodiments of the present disclosure, and the artificial potential field is introduced on the basis of this algorithm, thereby achieving that robotic arms explore an optimal obstacle avoidance path to reach a target point in an unknown space.

Figure 4:
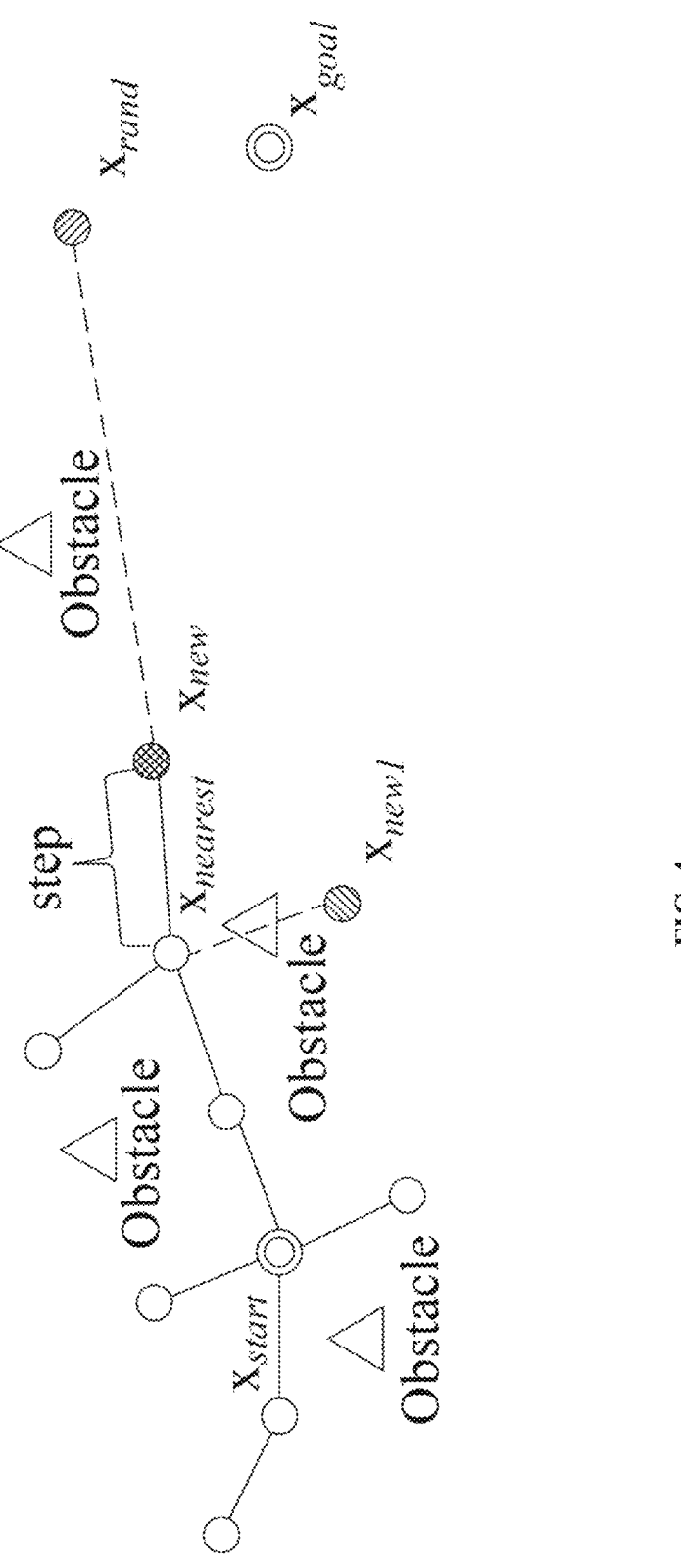
FIG. 4 is a schematic diagram of a principle of a standard RRT algorithm according to an embodiment of the present disclosure.

According to a standard RRT algorithm, first, an initial position $x_{start}$ of an end effector of a robotic arm is set as a root node of a random tree, a node $x_{rand}$ is randomly sampled in an action space of the robotic arm, a node $x_{nearest}$ closest to the node $x_{rand}$ on the random tree is selected as a node to be grown, and a node $x_{new}$ is generated according to a fixed step step along a direction of the node $x_{rand}$ and the node $x_{nearest}$. Whether a connecting line between the node $x_{nearest}$ and the node $x_{new}$ collides with an obstacle. If the connecting line between the node $x_{nearest}$ and the node $x_{new}$ does not collide with the obstacle, the node $x_{new}$ is added to the random tree, and the node $x_{nearest}$ is defined as a parent node of the node $x_{new}$. If a collision of a similar node $x_{new1}$ occurs, the node is deleted, re-sampling is performed, and the above steps are cyclically repeated until the random tree grows to a goal node $x_{goal}$. A principle of the standard RRT algorithm is shown in FIG. 4.

In the standard RRT, an increment of each node growth is only determined by a direction of the random sampling node $x_{rand}$ relative to the node $x_{nearest}$ and the fixed step step. In the embodiments of the present disclosure, the standard RRT algorithm is improved by introducing the artificial potential field, the increment of growth is also determined by an attractive force and a repulsive force experienced by the robotic arm at the node $x_{nearest}$. A formula for generating a new node is as follows:

$$x_{new} = x_{nearest} + step \frac{x_{rand} - x_{nearest}}{\|x_{rand} - x_{nearest}\|} + \lambda \frac{F_{total}}{\|F_{total}\|} \tag{4}$$

Where, $F_{total}$ is a resultant force of the attractive force and the repulsive force experienced by the robotic arm at the node $x_{nearest}$, $F_{total} = F_{att} + F_{rep}$, step is a fixed growth step, $\lambda$ is a potential field coefficient, and $\lambda <$step needs to be satisfied to ensure completeness of algorithm probability.

An attractive force function and a repulsive force function of the improved RRT algorithm are respectively as follows:

$$F_{att} = K_{att} \frac{x_{goal} - x_{nearest}}{\|x_{goal} - x_{nearest}\|} \tag{5}$$

-continued $$F_{rep} = \begin{cases} \dfrac{K_{rep}}{1 + e^{(2|d_{min}|/d_{rep}^* - 1)k}} \dfrac{d_{min}}{|d_{min}|} & |d_{min}| \le d_{rep}^* \\ 0 & |d_{min}| > d_{rep}^* \end{cases} \tag{6}$$

Where, $d_{min} = x_{nearest} - O_{nearest}$, $O_{nearest}$ is a point that is the closest to the node $x_{nearest}$ on an obstacle, $K_{att}$ and $K_{rep}$ are respectively an attractive force constant and a resultant force constant, k is a shape coefficient, and $$d_{rep}^*$$

is a repulsive force radius of a repulsive force field.

In the embodiments of the present disclosure, a growth distance of the improved RRT algorithm is jointly determined by the fixed step and a potential field component. When the node is close to the obstacle, the potential field component is mainly determined by the repulsive force function, which can adaptively adjust the growth distance of an obstacle area, and is beneficial for the random tree to pass through a narrow area. When the node is far away from the obstacle, the potential field component is mainly determined by the attractive force function at a target position, and the growth distance in a target area is large, which is beneficial to quickly reach the goal node, and reduce generation of redundant nodes, perform a biased path search, and improve computing efficiency.

In the embodiments of the present disclosure, the double-robotic-arm flexible collaborative module specifically includes a constraint unit, a decision-making planning unit, and a double-robotic-arm collaborative unit.

The constraint unit is configured to establish a constraint function about movement speeds, joint angles, and a path length in a double-robotic-arm collaborative process.

The decision-making planning unit is configured to determine the optimal double-robotic-arm collaborative technology by using the trained double-robotic-arm collaborative technology decision-making model according to the type information of the target circuit breaker part and a clamping pose information of the master robotic arm. A training process of the double-robotic-arm collaborative technology decision-making model includes: the double-robotic-arm collaborative technology decision-making model is trained by using a DDPG algorithm and a deep reinforcement learning algorithm in combination with the constraint unit and a reward and penalty function.

The double-robotic-arm collaborative unit is configured to determine a circuit breaker part pose adjustment assembly instruction according to the optimal double-robotic-arm collaborative technology.

Spatial poses of various types of circuit breaker parts in the loading tray have great randomness. A solution of the double-robotic-arm collaborative technology corresponding to the spatial poses also has great uncertainty. A traditional teaching demonstration method cannot cope with such complex and diverse working conditions. In the embodiments of the present disclosure, the double-robotic-arm collaborative technology decision-making model is trained by using the DDPG algorithm and the deep reinforcement learning algorithm and combining the constraint unit and the reward and penalty function to obtain the trained double-robotic-arm collaborative technology decision-making model, so that the decision-making planning unit determines the optimal double-robotic-arm collaborative technology with a small joint action, a short path, no collision, and fast time for the double robotic arms in the collaborative space for different spatial pose information of the target circuit breaker parts in different types. The double-robotic-arm collaborative unit controls the double robotic arms to complete pose adjustment and assembly of the target circuit breaker part.

In a reinforcement learning process, a behavior policy has to get a maximum reward score. For double-robotic-arm collaboration, a training objective is to obtain a suitable grabbing point and a collaborative adjustment point of the robotic arm according to the type information of the target circuit breaker part and grabbing pose information of the master robotic arm. A reward and penalty function equation $R=R_{time}+R_{limit}+R_{tool}+R_{avoid}+R_{collaborate}$ for the double robotic arms containing time, constraint, obstacle avoidance, proximity, and collaboration is designed for this objective, where $R_{time}$ represents a time penalty of the master robotic arm and the slave robotic arm. If a collaboration task is not completed within a specified time, the master robotic arm and the slave robotic arm are punished to prompt the master robotic arm and the slave robotic arm to complete the task quickly. $R_{limit}$ represents limiting each joint of the master robotic arm and the slave robotic arm to move within a specified rotation range, so as to obtain a high reward value and better achieve convergence efficiency. $R_{tool}$ represents a reward generated by the end effector. A reward is generated when the end effector of the master robotic arm is closer to the end effector of the slave robotic arm than a previous time. $R_{avoid}$ represents a penalty when the end effector of the robotic arm collides with an obstacle. $R_{collaborate}$ represents a reward when the master robotic arm hands over the target circuit breaker part with a pose to be adjusted to the slave robotic arm.

Figure 5:
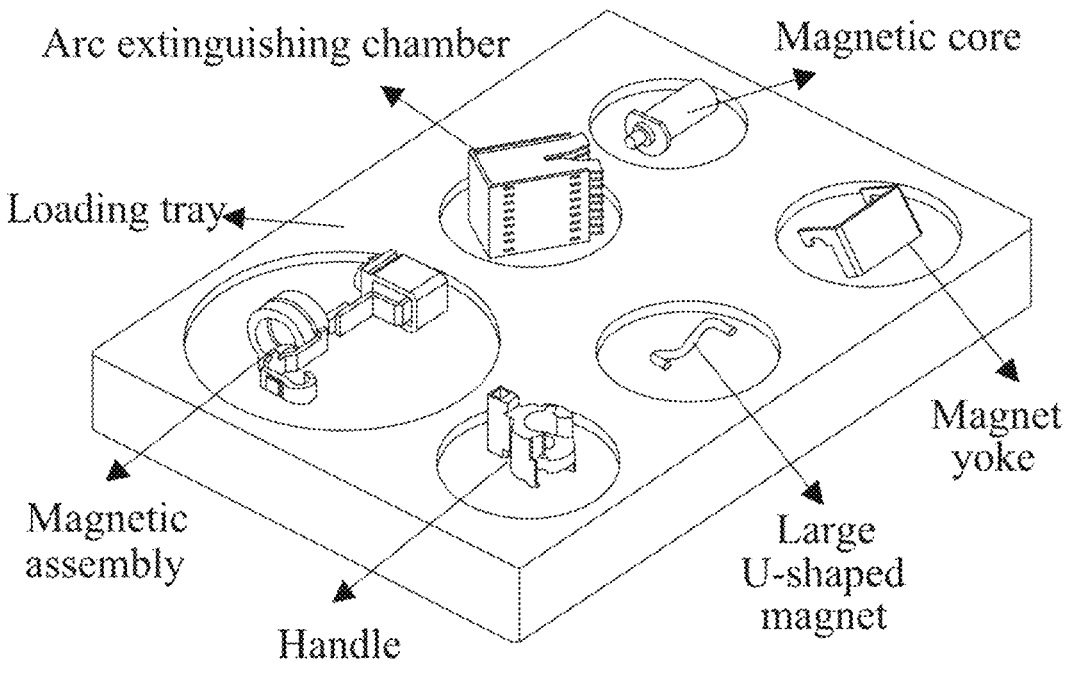
FIG. 5 is a distribution diagram of circuit breaker parts in a loading tray according to an embodiment of the present disclosure.

In the embodiments of the present disclosure, in an assembly feeding technology, six types of circuit breaker parts enter the assembly carrier at the same time. Different from a traditional feeding mode for a single type of circuit breaker part, the circuit breaker parts in six different specifications, including a magnetic assembly, a handle, a large U-shaped magnet, an arc extinguishing chamber, a magnet yoke, and a magnetic core, are randomly placed in the loading tray, and distribution of the circuit breaker parts in the loading tray is shown in FIG. 5.

Figure 6:
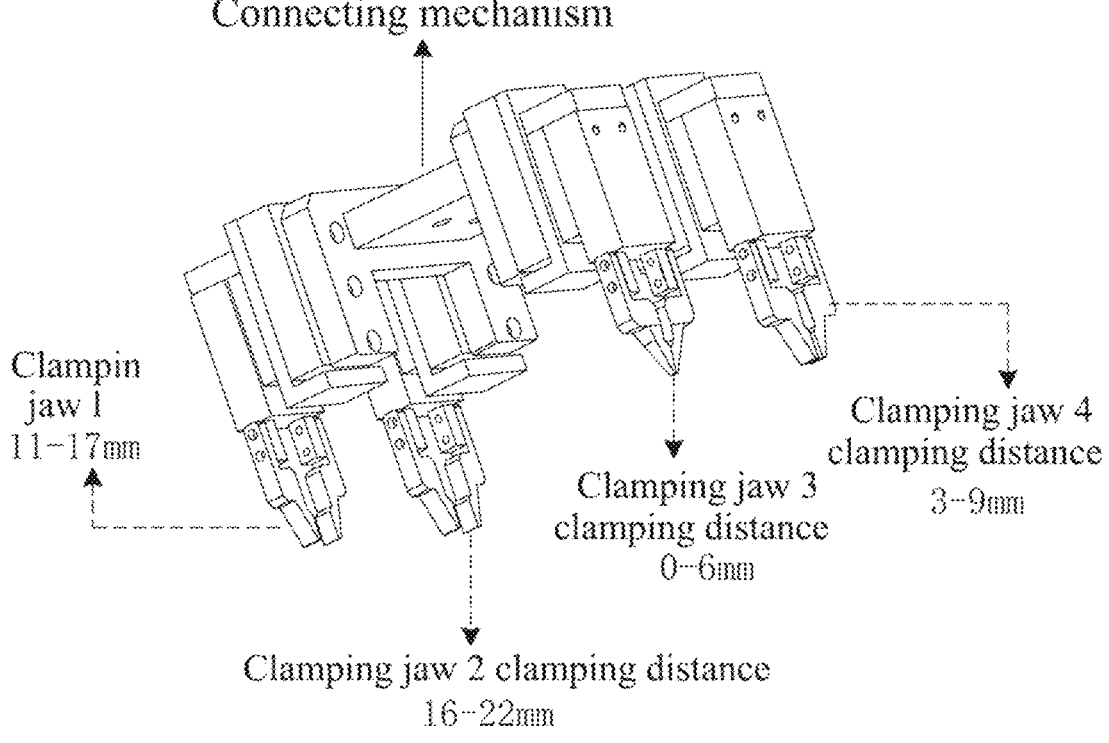
FIG. 6 is a structural diagram of an end effector according to an embodiment of the present disclosure.

For the circuit breaker parts in six different specifications in the loading tray, a set of multifunctional clamping jaws is used in the embodiments of the present disclosure. The decision-making planning unit selects a clamping jaw with a matched clamping distance for clamping according to the circuit breaker parts in different specifications and sizes. The end effector is shown in FIG. 6.

Figure 7:
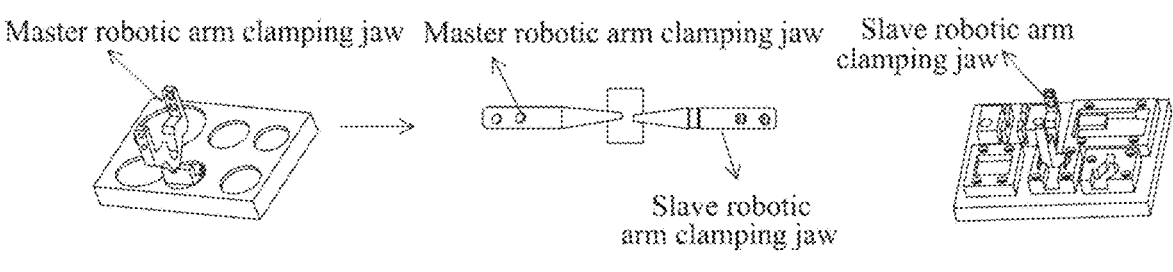
FIG. 7 is a flowchart of magnet yoke double-robotic-arm flexible assembly according to an embodiment of the present disclosure.
Figure 8A:
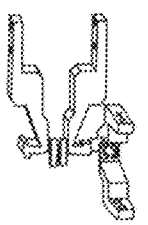
FIG. 8A-FIG. 8F are schematic diagrams of double-robotic-arm collaborative technologies for six circuit breaker parts according to an embodiment of the present disclosure.
Figure 8B:
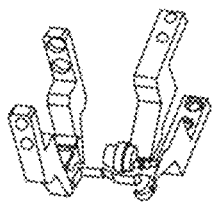
Figure 8C:
Figure 8D:
Figure 8E:
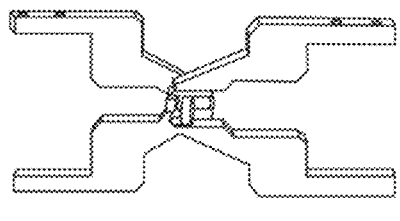
Figure 8F:
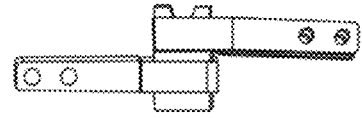

The target detection positioning module transmits, through the data communication unit, the spatial pose information of the circuit breaker part and type information of the circuit breaker part to the intelligent obstacle avoidance grabbing module to guide a robotic arm to grab the circuit breaker part. The flexible grabbing unit selects, according to the received type information of the circuit breaker part, a clamping jaw with a suitable clamping distance to grab the circuit breaker part. Meanwhile, the target detection positioning module transmits the type information of the circuit breaker part to the double-robotic-arm flexible collaborative module through the data communication unit. The decision-making planning unit determines the optimal double-robotic-arm collaborative technology according to the type information of the circuit breaker part and the clamping pose information of the master robotic arm. The double-robotic-arm collaborative unit controls the double robotic arms to complete pose adjustment of the target circuit breaker part, and finally, controls the slave robotic arm to assemble the target circuit breaker part to a corresponding position of the assembly carrier. A double-robotic-arm flexible assembly flow for the magnet yoke is shown in FIG. 7.

The poses of the target circuit breaker parts in the loading tray have randomness, and different poses lead to different clamping poses, so that double-robotic-arm collaborative technologies are different. Therefore, the decision-making planning unit needs to determine an optimal collaborative solution according to the type information of the circuit breaker part and a clamping pose of the master robotic arm. Collaborative technologies corresponding to respective examples of the six types of the circuit breaker parts are shown in FIG. 8A-FIG. 8F.

Pose adjustment of the disordered circuit breaker part is a key in a flexible assembly process. The poses of the target circuit breaker parts in the loading tray have randomness. The disordered circuit breaker parts need to be adjusted to standard poses for assembling. In the embodiments of the present disclosure, the double-robotic-arm collaborative technology is used to replace a traditional pose adjustment process that a single robotic arm is combined with a fixed mechanical auxiliary mechanism. An end effector simulates a human hand to collaborate and match to rotate and adjust angle of the disordered circuit breaker part to the pose and angle required by an assembly technology in the collaborative space. The collaboration of the double robotic arms improves operability of pose adjustment, reduces assembly production rhythm, and improves the production efficiency of the system.

Embodiment 2

The embodiments of the present disclosure provide a double-robotic-arm collaborative flexible assembly method for disordered circuit breaker parts. Double robotic arms include a master robotic arm and a slave robotic arm. The master robotic arm is mounted at a side close to a feeding tray. The slave robotic arm is mounted at a side close to an assembly carrier. Both the master robotic arm and the slave robotic arm are provided with end effectors. Movement processes of the double robotic arms are performed in three working spaces, namely, a grabbing space, a collaborative space, and an assembly space respectively.

The double-robotic-arm collaborative flexible assembly method provided in the embodiments of the present disclosure includes the following steps:

(1) Obtaining and processing an image of various types of circuit breaker parts disorderly placed in the loading tray, and determining spatial pose information and type information of each circuit breaker part;

(2) Determining an optimal obstacle avoidance path and clamping jaw types by using an improved RRT algorithm according to the spatial pose information and the type information of a target circuit breaker part, and determining a moving instruction according to the optimal obstacle avoidance path; where the improved RRT algorithm is an algorithm that introduces an artificial potential field on the basis of an RRT algorithm to jointly determine a node growth increment by a fixed step and a potential field component, the moving instruction is configured to control the master robotic arm to move from a corresponding end effector space position to a target circuit breaker part grabbing space position, control the master robotic arm to grab the target circuit breaker part to move from the target circuit breaker part grabbing space position to a collaborative space position, control the slave robotic arm to move from a corresponding end effector space position to the collaborative space position, and control the slave robotic arm to grab the target circuit breaker part with a standard assembly pose to move from the collaborative space position to the assembly space; and the target circuit breaker part is a circuit breaker part to be grabbed; and (3) Determining an optimal double-robotic-arm collaborative technology by using a trained double-robotic-arm collaborative technology decision-making model according to the type information of the target circuit breaker part, and determining a circuit breaker part pose adjustment assembly instruction according to the optimal double-robotic-arm collaborative technology, where the circuit breaker part pose adjustment assembly instruction is configured to control the slave robotic arm to adjust the target circuit breaker part that is grabbed by the master robotic arm and does not conform to an assembly pose to the target circuit breaker part with the standard assembly pose, and control the slave robotic arm to place the target circuit breaker part with the standard assembly pose into a loading mold.

Embodiment 3

Figure 9:
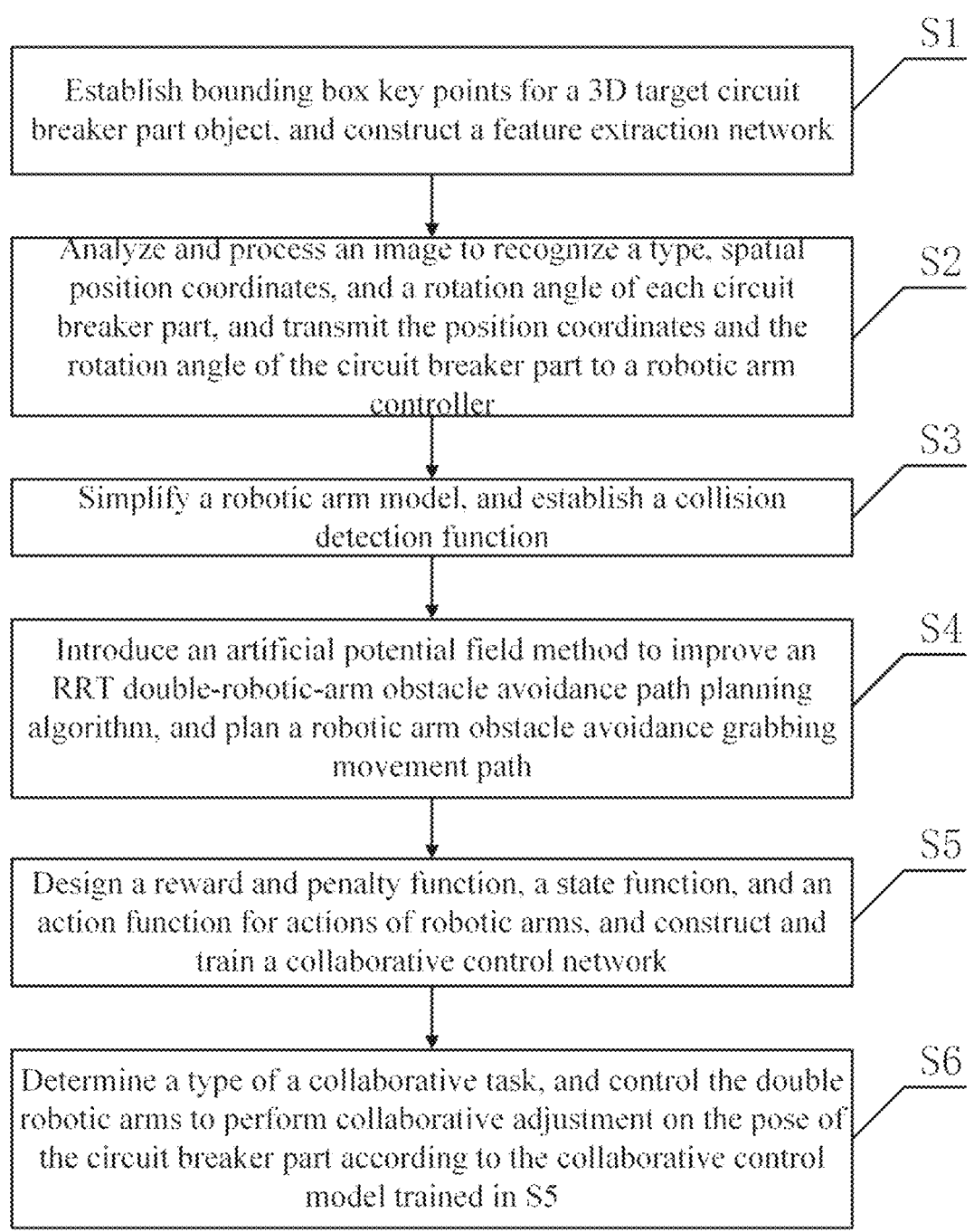
FIG. 9 is a schematic flowchart of a double-robotic-arm collaborative flexible assembly method for disordered circuit breaker parts according to an embodiment of the present disclosure.

The embodiments of the present disclosure provide a double-robotic-arm collaborative flexible assembly method for disordered circuit breaker parts, which is used in a double-robotic-arm collaborative flexible assembly system for circuit breaker flexible assembly. A step flowchart is as shown in FIG. 9. The method includes the following steps S1 to S6:

In S1, bounding box key points are established for a 3D target circuit breaker part object, and a feature extraction network is constructed. A bounding box is established for the target circuit breaker part, key points of the target circuit breaker part are selected as reference points, and virtual reference coordinates are established as a world coordinate system of the target circuit breaker part. Vertexes of the bounding box and a centroid of the 3D target circuit breaker part are taken as feature points. Protection feature points of the 3D target circuit breaker part on an RGB image are extracted through a trained deep convolutional neural network.

In S2, an image is analyzed and processed to recognize a type, spatial position coordinates, and a rotation angle of each circuit breaker part, and the position coordinates and the rotation angle of the circuit breaker part are transmitted to a robotic arm controller. The deep convolutional neural network is trained by taking projection coordinates of the vertexes and the centroid as an input, and 2D coordinate prediction values of the bounding box of the target circuit breaker part are output.

In S3, a robotic arm model is simplified, and a collision detection function is established. Complex model structures of the robotic arms are replaced by using cylinder-sphere bounding boxes. Collision detection of the double robotic arms may be converted into interference detection between two bounding boxes, and a geometric distance calculation function between center lines of two bounding boxes is established to achieve collision detection between the robotic arm and an obstacle around.

In S4, an robotic arm obstacle avoidance grabbing movement path is planned by introducing an artificial potential field method to improv RRT double-robotic-arm obstacle avoidance path planning algorithm. Priority of two robotic arms is set according to a control policy of the double robotic arms, and a master robotic arm and a slave robotic arm are respectively arranged. An obstacle interference determination is performed according to the position of the obstacle in a movement process of the master robotic arm. The master robotic arm and objects in the movement space are regarded as obstacles in the movement process of the slave robotic arm. An artificial potential field function is established according to the target point and environmental obstacle information, and an RRT is guided to perform biased search, so as to rapidly explore an optimal secure grabbing path.

In S5, a reward and penalty function, a state function, and an action function are designed for actions of robotic arms, and a collaborative control network is constructed and trained. The reward and penalty function and a constraint function are set for the double robotic arms, so that a maximum reward is obtained to perform self-motivated learning, detect a state space, and collect state information of environmental objects, for example, a joint angle of each robotic arm, a spatial position of the target circuit breaker part, and a relative position between a clamping jaw of the robotic arm and the target circuit breaker part. An angle of each joint of each robotic arm rotating around a rotation axis is designed as a parameter of the action function, a random angle of each joint in a rotation joint angular movement range at a fixed time step is designed, and the double-robotic-arm collaborative technology decision-making model is trained according to the designed reward and penalty function, the constraint function, a state observation function, and the action function.

In S6, a type of a collaborative task is determined according to the type and the spatial pose information of the circuit breaker part recognized in S2, and the double robotic arms are controlled to perform collaborative adjustment on the pose of the circuit breaker part according to the collaborative control model trained in S5.

Embodiment 4

Technical solutions in the embodiments of the present disclosure are clearly and completely described below in combination with the double-robotic-arm collaborative flexible assembly system for disordered circuit breaker parts according to Embodiment 1 of the present disclosure.

Figure 10:
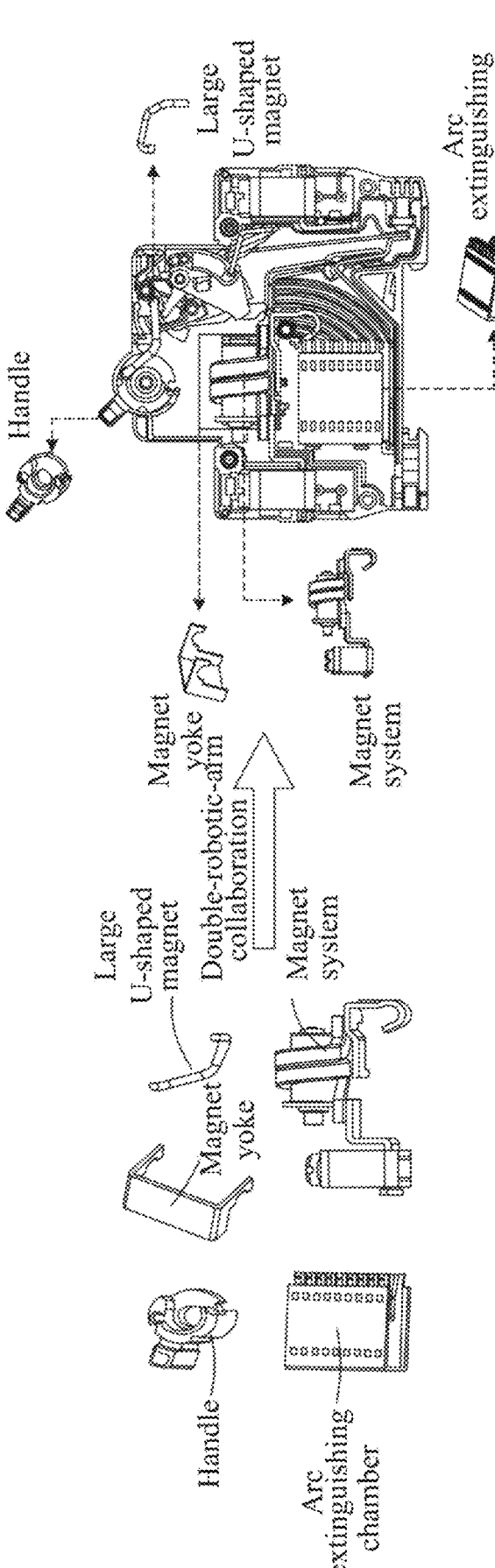
FIG. 10 is a physical image of an application object according to an embodiment of the present disclosure.
Figure 11:
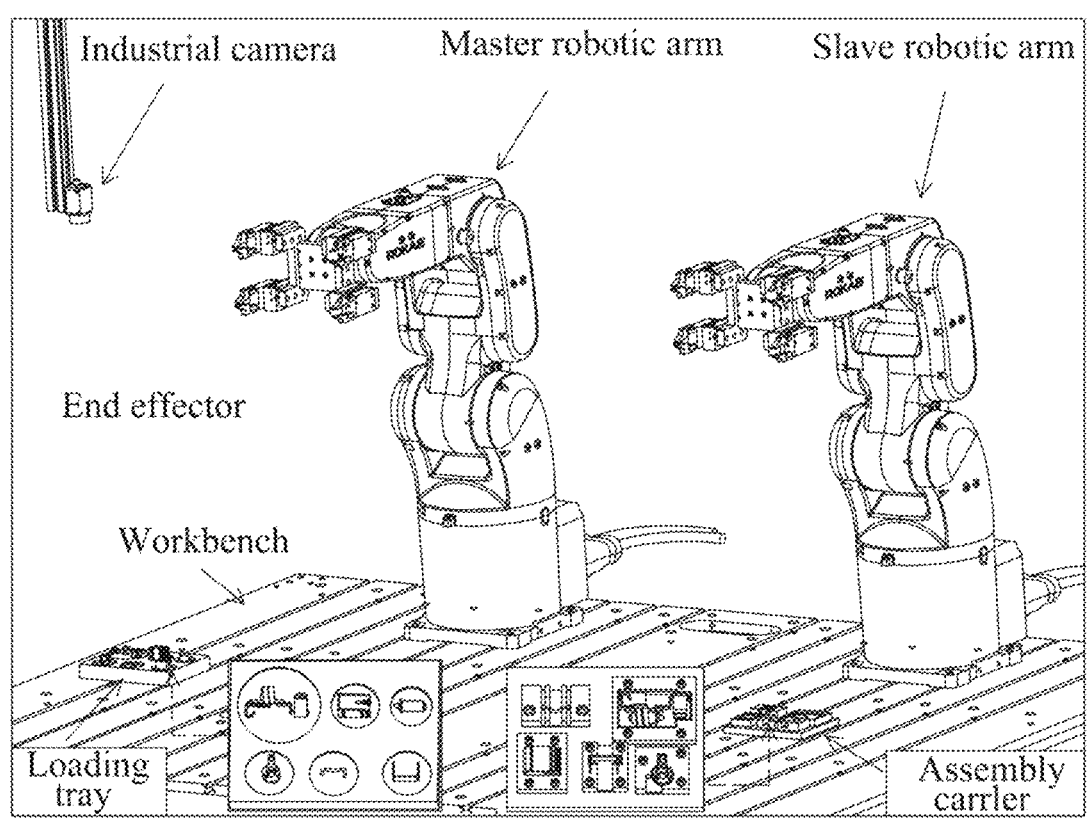
FIG. 11 is a schematic layout of a double-robotic-arm collaborative flexible assembly system according to an embodiment of the present disclosure.

An application object of the embodiments of the present disclosure is shown in FIG. 10. A schematic layout of the double-robotic-arm collaborative flexible assembly system is shown in FIG. 11. Two robotic arms are mounted on a workbench in parallel. A distance between a master robotic arm and a slave robotic arm is 750 mm. The master robotic arm is mounted at a side close to a loading tray. The slave robotic arm is mounted at a side close to an assembly carrier. An industrial camera is suspended and installed 800 mm above the loading tray. Sixth joints of the two robotic arms are respectively mounted with end effectors. This system can achieve accurate grabbing of the circuit breaker parts in different types and different specifications, such as a handle, a large U-shaped magnet, a magnet yoke, a magnetic core, a magnetic assembly, and an arc extinguishing chamber in the loading tray, and an optimal collision-free obstacle avoidance path is planned by using an improved RRT algorithm.

Figure 12:
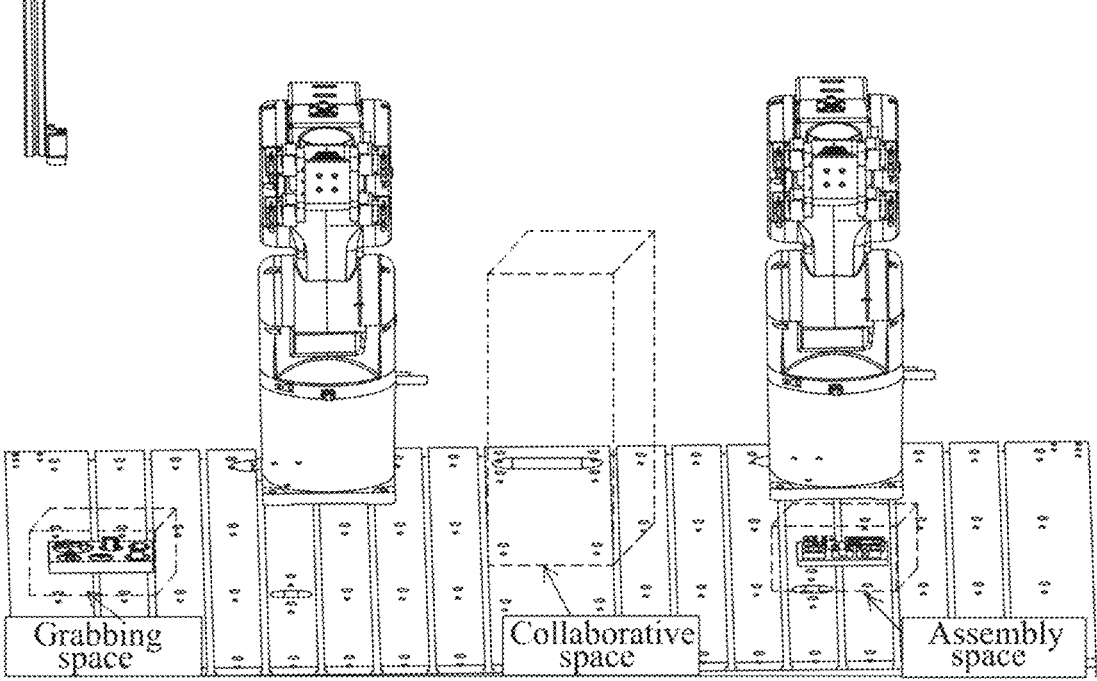
FIG. 12 is a schematic diagram of a working space of a double-robotic-arm collaborative flexible assembly system according to an embodiment of the present disclosure.

In a circuit breaker part flexible assembly process, priority of two robotic arms is set according to a control policy of the double robotic arms, and a master robotic arm and a slave robotic arm are respectively arranged. Movement processes of the double robotic arms include four stages of accurate grabbing, obstacle avoidance planning, collaborative adjustment, and flexible assembly. These four stages are performed in three working spaces. An end effector of a robotic arm starts to perform corresponding actions when entering a corresponding working space. The three working spaces are respectively a grabbing space when the master robotic arm grabs a target circuit breaker part (that is, a circuit breaker part to be grabbed), a collaborative space when the master robotic arm and the slave robotic arm collaborate and match to adjust a pose of the circuit breaker part, and an assembly space when the slave robotic arm clamps and assembles the circuit breaker part with a standard assembly pose. The working spaces of the double-robotic-arm collaborative flexible assembly system is shown in FIG. 12. In the collaborative adjustment stage, a task of the slave robotic arm is to adjust the target circuit breaker part that is grabbed by the master robotic arm and does not conform to an assembly pose to the standard assembly pose, and to achieve collision-free assembly.

Figure 13:
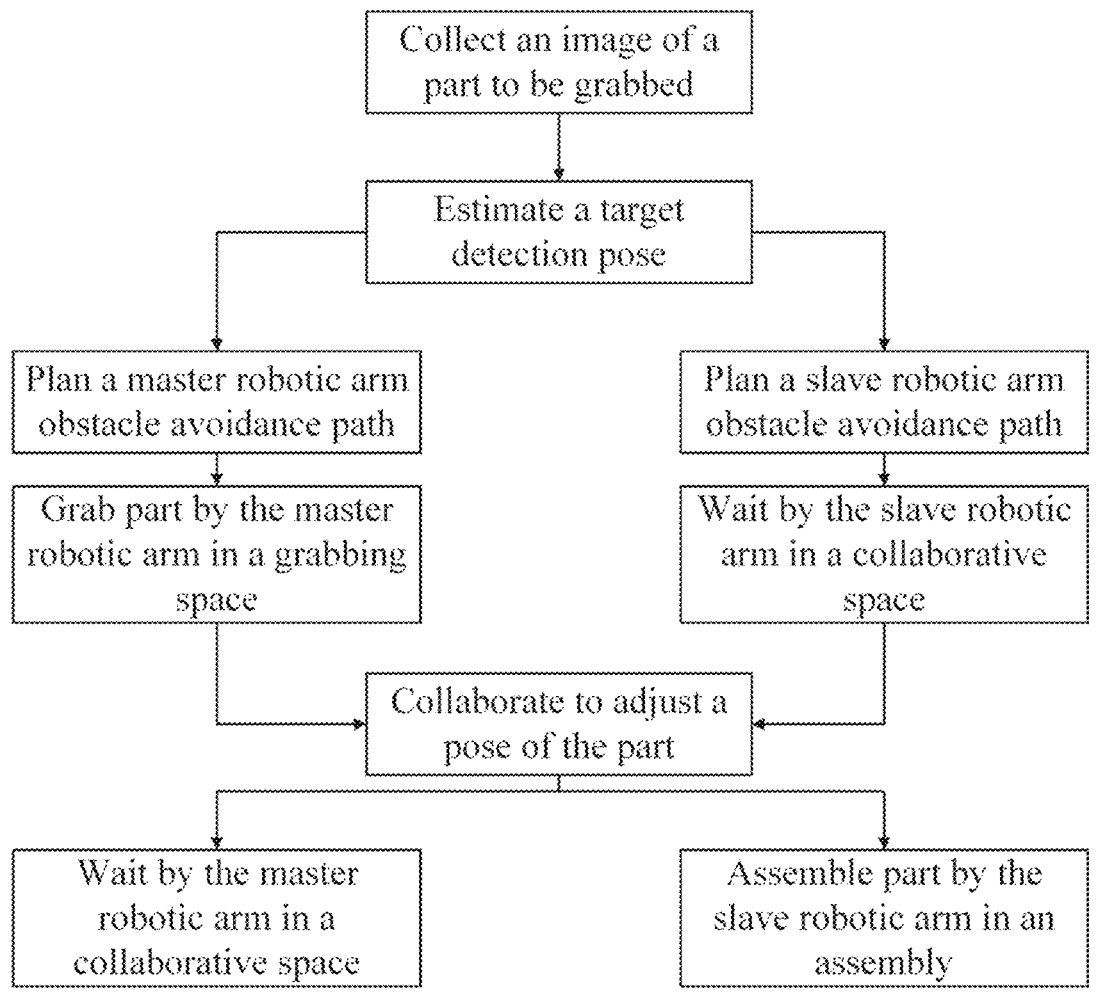
FIG. 13 is a working flowchart of a double-robotic-arm collaborative flexible assembly system according to an embodiment of the present disclosure.

A working flow of the double-robotic-arm collaborative flexible assembly system is shown in FIG. 13. An industrial camera collects an image of a target circuit breaker part, and spatial pose information and type information of the target circuit breaker part are calculated through a target detection positioning module. Obstacle avoidance path planning needs to be performed to avoid a collision between one robotic arm and the other robotic arm or between the robotic arms and environmental obstacles in processes that the master robotic arm moves between the collaborative space and the grabbing space and the slave robotic arm moves between the collaborative space and an assembly space. The master robotic arm moves to the grabbing space along the optimal obstacle avoidance path to grab the target circuit breaker part. The slave robotic arm moves to the collaborative space along the optimal obstacle avoidance path to wait for the master robotic arm to clamp the circuit breaker part with an assembly pose to be adjusted. When the master robotic arm clamps the circuit breaker part with the assembly pose to be adjusted and enters the collaborative space, the decision-making planning unit obtains the optimal double-robotic-arm collaborative technology by using the trained double-robotic-arm collaborative technology decision-making model according to the type information of the target circuit breaker part and clamping pose information of the master robotic arm, and controls the master robotic arm and the slave robotic arm to match to complete adjustment of an assembly pose of the target circuit breaker part. Finally, the slave robotic arm places the target circuit breaker part which is adjusted to the standard assembly pose into the assembly carrier. Except for a collaborative stage, that is, a movement stage other than collaborative control of the two robotic arms, the two robotic arms move in parallel without any priority and complete corresponding action instructions respectively. After completing a collaborative action, the master robotic arm transmits an image collection triggering signal to the industrial camera to start a new round of working process.

In the embodiments of the present disclosure, to solve a problem about double-robotic-arm obstacle avoidance path planning, the artificial potential field is introduced to obtained the improved RRT algorithm. The obstacle avoidance path planning according to the standard RRT algorithm has the disadvantages that an environmental exploration capacity is insufficient, a convergence rate is low, path quality is poor, global search is over-average, algorithm efficiency is low, and planned paths are often not the optimal path. For the above problems, the embodiments of the present disclosure provide an RRT algorithm for global adaptive step and redundant node deletion applicable to double robotic arms, that is, the improved RRT algorithm. Map information is collected, and the artificial potential field is introduced, so that an initial step and a local step are adaptively adjusted, the exploration capacity and the adaptability of the RRT algorithm to a map are improved, and the path quality is improved in combination with a redundant path node deletion policy.

Figure 14A:
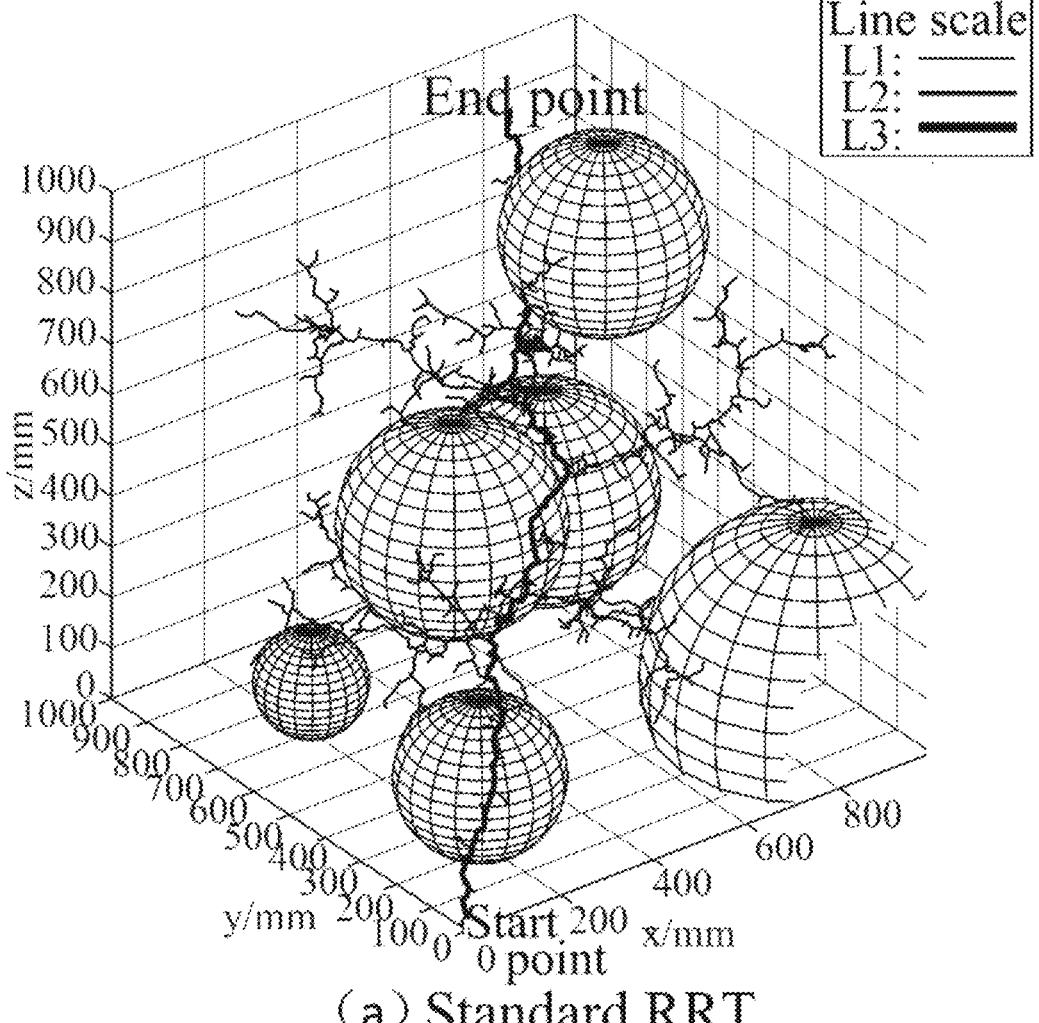
FIG. 14A-FIG. 14B are schematic diagrams of obstacle avoidance path planning based on an RRT algorithm in a 3-Dimensional (3D) space environment according to an embodiment of the present disclosure; part (a) in FIG. 14A is a schematic diagram of obstacle avoidance path planning based on a standard RRT algorithm in a 3D space environment; part (b) in FIG. 14B is a schematic diagram of obstacle avoidance path planning based on an improved RRT algorithm in a 3D space environment.
Figure 14B:
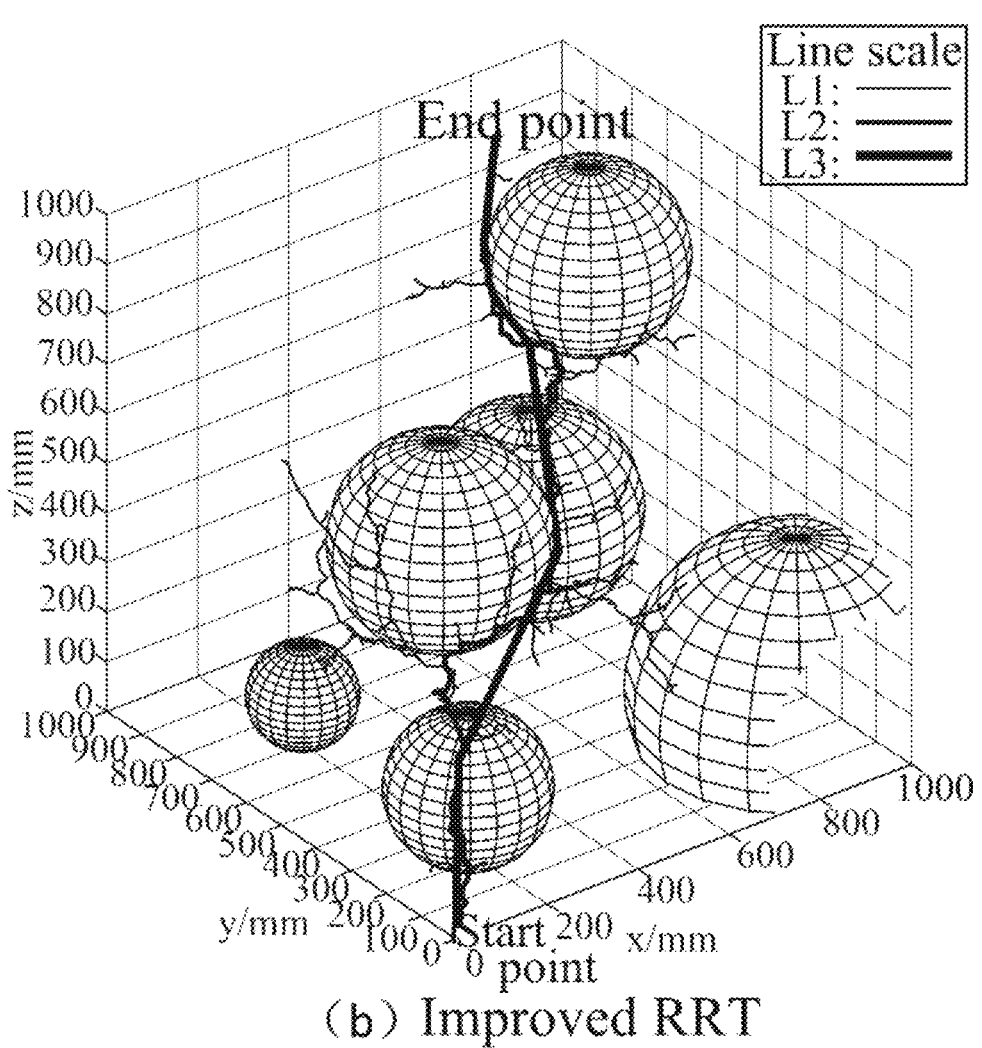
Figure 15A:
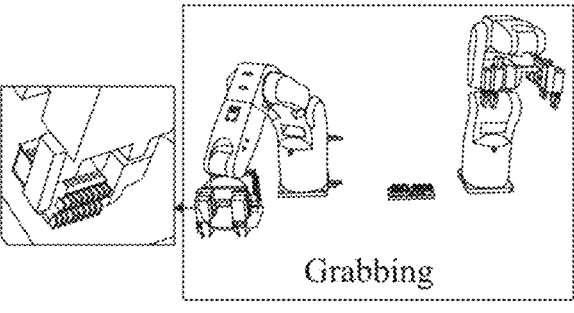
FIG. 15A-FIG. 15D are a flowchart of collaboration of double robotic arms for an arc extinguishing chamber according to an embodiment of the present disclosure.
Figure 15B:
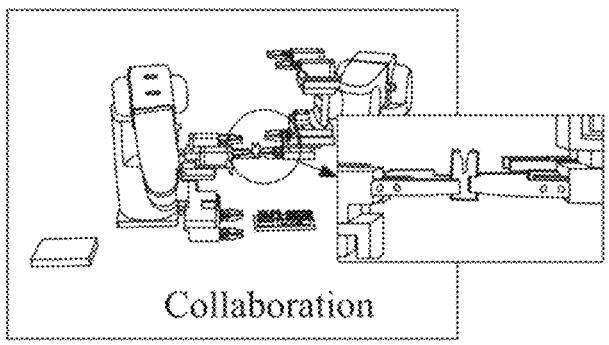
Figure 15C:
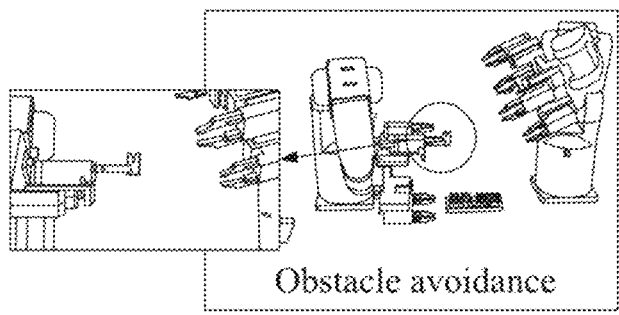
Figure 15D:
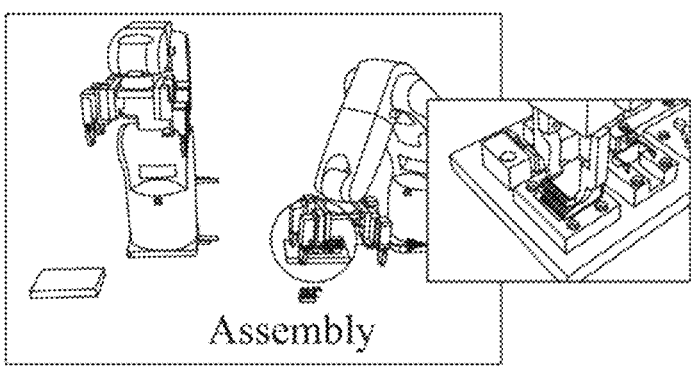

RRT obstacle avoidance path planning in a 3D space environment is shown in FIG. 14A and FIG. 14B. A simulation map is 1000×1000×1000, and six obstacles in different sizes and positions are set. A solid line in scale L2 in FIG. 14A is an obstacle avoidance path planned before algorithm optimization, a line segment in scale L1 is a growth condition of an exploring tree in a space, and a solid line in scale L3 in part (b) in FIG. 14B is a path after optimization. It can be learned from experimental results in Table 1 that the improved RRT algorithm reduces the number of nodes by 89.93%, shortens the planning time by 78.36%, and reduces a path length by 25.56% compared with a standard RRT algorithm. It can be obtained by comparison that the improved RRT algorithm reduces invalid growth of the random tree, the random tree grows towards a target in a biased manner, and a path is smoother after redundant nodes were removed.

TABLE 1

| RRT obstacle avoidance planning experimental results in 3D space environment | | | |
| --- | --- | --- | --- |
| Algorithm type | Number of nodes/nodes | Planning time/s | Path length/mm |
| Standard RRT | 149 | 15.48 | 2237.13 |
| Improved RRT | 15 | 3.35 | 1665.24 |

In the embodiments of the present disclosure, the double-robotic-arm collaborative technology decision-making model is trained by using the deep reinforcement learning algorithm. The reward and penalty function and the constraint function are set for the double robotic arms, so that a maximum reward is obtained to perform self-motivated learning, detect a state space, and collect state information of environmental objects, for example, a joint angle of each robotic arm, a spatial position of the target circuit breaker part, and a relative position between a clamping jaw of the robotic arm and the target circuit breaker part. An angle of each joint of each robotic arm rotating around a rotation axis is designed as a parameter of the action function, a random angle of each joint in a rotation joint angular movement range at a fixed time step is designed, and the double-robotic-arm collaborative technology decision-making model is trained according to the designed reward and penalty function, the constraint function, the state observation function, and the action function. The optimal double-robotic-arm collaborative technology may be obtained by inputting the type information of the target circuit breaker part to be adjusted and pose angle information of the target circuit breaker part in the collaborative space into the trained double-robotic-arm collaborative technology decision-making model.

As shown in FIG. 15A-FIG. 15D, spatial pose information and type information of an arc extinguishing chamber are received. A clamping jaw with a suitable stroke is selected for clamping. The double-robotic-arm collaborative technology decision-making model trained in advance is applied to output the optimal double-robotic-arm collaborative technology. The double robotic arms are controlled to complete adjustment of a pose of the arc extinguishing chamber. The double robotic arms are planned an optimal obstacle avoidance path according to the improved RRT algorithm, so as to complete obstacle avoidance grabbing and assembly.

As shown in Table 2, compared with a traditional automatic assembly solution and a single-robotic arm assembly solution, a double-robotic-arm solution can complete an assembly task for the circuit breaker parts in different types and different specifications (for examples, for a handle, a large U-shaped magnet, a magnet yoke, a magnetic core, a magnetic assembly, and an arc extinguishing chambers) by only one piece of equipment, and key point positions and action path are respectively improved by 46.7% and 75.8%, energy consumption of the equipment can be reduced, and the assembly success rate of the circuit breaker parts is improved.

TABLE 2

| Experimental comparison results of different assembly solutions | | | | |
| --- | --- | --- | --- | --- |
| Assembly solution | Number of equipment/pieces | Key point position/positions | Action path/m | Success rate/% |
| Traditional automatic assembly solution | 9 | 30 | 18.6 | 87.3 |
| Single-robotic arm assembly solution | 2 | 22 | 10 | 92.6 |
| Double-robotic arm assembly solution | 1 | 16 | 4.5 | 97.3 |

Various embodiments in the present specification are described in a progressive manner. Each embodiment focuses on differences from other embodiments, and the same and similar parts of various embodiments may refer to one another. The method disclosed by the embodiments is described relatively simply since it corresponds to the system disclosed by the embodiments, and relevant part may refer to the description of the system section.

Specific examples are used to describe a principle and implementations of the present disclosure herein. The description of the embodiments above is merely intended to help understand the method of the present disclosure and a core idea of the present disclosure. Meanwhile, those of ordinary skill in the art may make modifications to the specific implementations and a scope of application based on the idea of the present disclosure. In conclusion, content of the present specification is not to be construed as a limitation to the present disclosure.

What is claimed is:

1. A double-robotic-arm collaborative flexible assembly system for disordered circuit breaker parts, wherein double robotic arms comprise a master robotic arm and a slave robotic arm; the master robotic arm is mounted at a side close to a loading tray; the slave robotic arm is mounted at a side close to an assembly carrier; each of the master robotic arm and the slave robotic arm is provided with an end effector, wherein movement processes of the double robotic arms are performed in three working spaces comprising a grabbing space, a collaborative space, and an assembly space; and the double-robotic-arm collaborative flexible assembly system comprises:

a target detection positioning module, configured to obtain and process an image of various types of circuit breaker parts disorderly placed in the loading tray, and determine spatial pose information and type information of each circuit breaker part;

an intelligent obstacle avoidance grabbing module, configured to determine an optimal obstacle avoidance path and clamping jaw types by using an improved Rapidly-Exploring Random Trees (RRT) algorithm according to the spatial pose information and the type information of a target circuit breaker part, and determine a moving instruction according to the optimal obstacle avoidance path, wherein the improved RRT algorithm is an algorithm that introduces an artificial potential field on a basis of an RRT algorithm to jointly determine a node growth increment by a fixed step and a potential field component; the moving instruction is configured to control the master robotic arm to move from a corresponding end effector space position to a target circuit breaker part grabbing space position, control the master robotic arm to grab the target circuit breaker part to move from the target circuit breaker part grabbing space position to a collaborative space position, control the slave robotic arm to move from a corresponding end effector space position to the collaborative space position, and control the slave robotic arm to grab the target circuit breaker part with a standard assembly pose to move from the collaborative space position to the assembly space; and the target circuit breaker part is a circuit breaker part to be grabbed; and a double-robotic-arm flexible collaborative module, configured to determine an optimal double-robotic-arm collaborative technology by using a trained double-robotic-arm collaborative technology decision-making model according to the type information of the target circuit breaker part, and determine a circuit breaker part pose adjustment assembly instruction according to the optimal double-robotic-arm collaborative technology, wherein the circuit breaker part pose adjustment assembly instruction is configured to control the slave robotic arm to adjust the target circuit breaker part that is grabbed by the master robotic arm and does not conform to an assembly pose to the target circuit breaker part with the standard assembly pose, and control the slave robotic arm to place the target circuit breaker part with the standard assembly pose into a loading mold.

2. The double-robotic-arm collaborative flexible assembly system for the disordered circuit breaker parts according to claim 1, wherein the target detection positioning module comprises:

an image collection unit, configured to obtain a Red-Green-Blue (RGB) image of various types of circuit breaker parts disorderly placed in the loading tray shot by an industrial camera;

an image processing unit, configured to:

process the RGB image, and determine the type information of each circuit breaker part;

extract 2-Dimensional (2D) projection feature points of each circuit breaker part on the RGB image by using a deep convolutional neural network;

calculate a spatial position and a rotation angle of each circuit breaker part in a camera coordinate system according to the 2D projection feature points and a Perspective-n-Point (PnP) algorithm; and determine a spatial position and a rotation angle of each circuit breaker part in a robotic arm coordinate system according to the spatial position and the rotation angle of the circuit breaker part in the camera coordinate system, wherein the spatial pose information comprises the spatial position and the rotation angle in the robotic arm coordinate system; and a data communication unit, configured to, by using a Transmission Control Protocol (TCP), transmit the spatial pose information and the type information of each circuit breaker part to the intelligent obstacle avoidance grabbing module, and transmit the type information of each circuit breaker part to the double-robotic-arm flexible collaborative module.

3. The double-robotic-arm collaborative flexible assembly system for the disordered circuit breaker parts according to claim 1, wherein the intelligent obstacle avoidance grabbing module comprises:

an obstacle avoidance planning unit, configured to determine a grabbing space position point according to the received spatial pose information of the target circuit breaker part, and plan the optimal obstacle avoidance path by taking the grabbing space position point as a target point of the optimal obstacle avoidance path and combining the improved RRT algorithm;

a flexible grabbing unit, configured to determine clamping jaw types of the master robotic arm and the slave robotic arm according to the received type information of the target circuit breaker part; and a robotic arm control unit, configured to determine the moving instruction according to the optimal obstacle avoidance path.

4. The double-robotic-arm collaborative flexible assembly system for the disordered circuit breaker parts according to claim 3, wherein the obstacle avoidance planning unit is configured to:

replace joint models of the double robotic arms and environmental obstacles by using bounding boxes to obtain a simplified double-robotic-arm working model;

in the simplified double-robotic-arm working model, determine the grabbing space position point according to the received spatial pose information of the target circuit breaker part, and plan the optimal obstacle avoidance path comprising the master robotic arm moving from the corresponding end effector space position to the target circuit breaker part grabbing space position, the master robotic arm grabbing the target circuit breaker part to move from the target circuit breaker part grabbing space position to the collaborative space position, the slave robotic arm moving from the corresponding end effector space position to the collaborative space position, and the slave robotic arm grabbing the target circuit breaker part with the standard assembly pose from the collaborative space position to the assembly space by taking the grabbing space position point as the target point of the optimal obstacle avoidance path and combining the improved RRT algorithm.

5. The double-robotic-arm collaborative flexible assembly system for the disordered circuit breaker parts according to claim 1, wherein the double-robotic-arm flexible collaborative module comprises:

a constraint unit, configured to establish a constraint function about movement speeds, joint angles, and path length in a double-robotic-arm collaborative process;

a decision-making planning unit, configured to determine the optimal double-robotic-arm collaborative technology by using the trained double-robotic-arm collaborative technology decision-making model according to the type information of the target circuit breaker part and clamping pose information of the master robotic arm, wherein a training process of the double-robotic-arm collaborative technology decision-making model comprises: training the double-robotic-arm collaborative technology decision-making model by using a Deep Deterministic Policy Gradient (DDPG) algorithm and a deep reinforcement learning algorithm in combination with the constraint function and a reward and penalty function; and a double-robotic-arm collaborative unit, configured to determine the circuit breaker part pose adjustment assembly instruction according to the optimal double-robotic-arm collaborative technology.

6. The double-robotic-arm collaborative flexible assembly system for the disordered circuit breaker parts according to claim 1, wherein an execution process that the master robotic arm moves from the corresponding end effector space position to the target circuit breaker part grabbing space position and an execution process that the slave robotic arm moves from the corresponding end effector space position to the collaborative space position are executed in a parallel execution sequence.

7. The double-robotic-arm collaborative flexible assembly system for the disordered circuit breaker parts according to claim 1, wherein an execution process that the master robotic arm grabs the target circuit breaker part to move from the target circuit breaker part grabbing space position to the collaborative space position and an execution process that the slave robotic arm grabs the target circuit breaker part with the standard assembly pose from the collaborative space position to the assembly space are executed in a successive sequence.

8. A double-robotic-arm collaborative flexible assembly method for disordered circuit breaker parts, wherein double robotic arms comprise a master robotic arm and a slave robotic arm; the master robotic arm is mounted at a side close to a loading tray; the slave robotic arm is mounted at a side close to an assembly carrier; each of the master robotic arm and the slave robotic arm is provided with an end effector, wherein movement processes of the double robotic arms are performed in three working spaces comprising a grabbing space, a collaborative space, and an assembly space; the double-robotic-arm collaborative flexible assembly method comprising:

obtaining and processing an image of various types of circuit breaker parts disorderly placed in the loading tray, and determining spatial pose information and type information of each circuit breaker part;

determining an optimal obstacle avoidance path and clamping jaw types by using an improved RRT algorithm according to the spatial pose information and the type information of a target circuit breaker part, and determining a moving instruction according to the optimal obstacle avoidance path, wherein the improved RRT algorithm is an algorithm that introduces an artificial potential field on a basis of an RRT algorithm to jointly determine a node growth increment by a fixed step and a potential field component, the moving instruction is configured to control the master robotic arm to move from a corresponding end effector space position to a target circuit breaker part grabbing space position, control the master robotic arm to grab the target circuit breaker part to move from the target circuit breaker part grabbing space position to a collaborative space position, control the slave robotic arm to move from a corresponding end effector space position to the collaborative space position, and control the slave robotic arm to grab the target circuit breaker part with a standard assembly pose from the collaborative space position to the assembly space, and the target circuit breaker part is a circuit breaker part to be grabbed; and determining an optimal double-robotic-arm collaborative technology by using a trained double-robotic-arm collaborative technology decision-making model according to the type information of the target circuit breaker part, and determining a circuit breaker part pose adjustment assembly instruction according to the optimal double-robotic-arm collaborative technology, wherein the circuit breaker part pose adjustment assembly instruction is configured to control the slave robotic arm to adjust the target circuit breaker part that is grabbed by the master robotic arm and does not conform to an assembly pose to the target circuit breaker part with the standard assembly pose, and control the slave robotic arm to place the target circuit breaker part with the standard assembly pose into a loading mold.

* * * * *